(12) United States Patent
Yan et al.

(10) Patent No.: US 11,695,629 B2
(45) Date of Patent: Jul. 4, 2023

(54) METHOD AND APPARATUS FOR CONFIGURING A NETWORK PARAMETER

(71) Applicant: HUAWEI TECHNOLOGIES CO., LTD., Guangdong (CN)

(72) Inventors: Siyu Yan, Beijing (CN); Di Qu, Beijing (CN); Zhigang Ji, Beijing (CN); Yinben Xia, Shenzhen (CN)

(73) Assignee: HUAWEI TECHNOLOGIES CO., LTD., Guangdong (CN)

( * ) Notice: Subject to any disclaimer, the term of this patent is extended or adjusted under 35 U.S.C. 154(b) by 0 days.

(21) Appl. No.: 17/692,475

(22) Filed: Mar. 11, 2022

(65) Prior Publication Data
US 2022/0200858 A1 Jun. 23, 2022

Related U.S. Application Data

(63) Continuation of application No. PCT/CN2020/112322, filed on Aug. 29, 2020.

(30) Foreign Application Priority Data

Sep. 12, 2019 (CN) .......................... 201910867097.9
Dec. 25, 2019 (CN) .......................... 201911353303.0

(51) Int. Cl.
*H04L 41/0816* (2022.01)
*H04L 41/08* (2022.01)
(Continued)

(52) U.S. Cl.
CPC ...... *H04L 41/0816* (2013.01); *H04L 41/0886* (2013.01); *H04L 43/065* (2013.01); *H04L 43/0817* (2013.01); *H04L 47/122* (2013.01)

(58) Field of Classification Search
CPC .................. H04L 43/065; H04L 43/0817
See application file for complete search history.

(56) References Cited

U.S. PATENT DOCUMENTS 6,842,424 B1 * 1/2005 Key .................. H04L 47/37
370/236
7,369,500 B1 5/2008 Gallagher et al.
(Continued)

FOREIGN PATENT DOCUMENTS

CN 101106399 A 1/2008
CN 101370274 A 2/2009
(Continued)

OTHER PUBLICATIONS

Yifei Lu et al.,"Dynamic ECN marking threshold algorithm for TCP congestion control in data center networks", Computer Communications 129 (2018) 197 208, total 12 pages.
(Continued)

*Primary Examiner* — Philip C Lee
(74) *Attorney, Agent, or Firm* — Womble Bond Dickinson (US) LLP

(57) ABSTRACT

This application relates to the field of communications technologies, and discloses a network parameter (for example, an ECN threshold) configuration method and an apparatus, to dynamically configure a network parameter based on a change of a network transmission characteristic, so that the network parameter is dynamically adapted to a change of network traffic, thereby ensuring network transmission performance. The method includes: obtaining network statistical data corresponding to a first period, where the network statistical data includes a network transmission characteristic of a network device in the first period and a first value corresponding to a specified network parameter; determining, based on the network statistical data, a second value corresponding to the specified network parameter; and configuring the specified network parameter of the network device in a second period to the second value, where the second period is a period after the first period.

18 Claims, 7 Drawing Sheets

(51) Int. Cl.
    *H04L 43/065* (2022.01)
    *H04L 43/0817* (2022.01)
    *H04L 47/122* (2022.01)

(56) References Cited

U.S. PATENT DOCUMENTS

| | | | |
|---|---|---|---|
| 7,990,868 B1 | 8/2011 | Gallagher et al. | |
| 2004/0111541 A1* | 6/2004 | Meyer | H04L 47/32 710/52 |
| 2008/0239953 A1 | 10/2008 | Bai et al. | |
| 2011/0075563 A1 | 3/2011 | Leung et al. | |
| 2014/0064079 A1* | 3/2014 | Kwan | H04L 47/30 370/234 |
| 2014/0153387 A1* | 6/2014 | Wu | H04L 47/36 370/252 |

FOREIGN PATENT DOCUMENTS

| | | |
|---|---|---|
| CN | 101951629 A | 1/2011 |
| CN | 102571973 A | 7/2012 |
| CN | 103281255 A | 9/2013 |
| CN | 103648058 A | 3/2014 |
| CN | 108476091 A | 8/2018 |
| CN | 109512753 A | 3/2019 |
| CN | 110061927 A | 7/2019 |
| WO | 2014133693 A1 | 9/2014 |

OTHER PUBLICATIONS

Sijo Joy,"Improving Flow Completion Time and Throughput in Data Center Networks", Feb. 1, 2015 (Feb. 1, 2015) XP055279717, Total 88 Pages.

Lu Yifei et al: "Dynamic ECN marking threshold algorithm for TCP congestion control in data center networks" Computer Communications; Elsevier Science Publishers BV, Amsterdam, NL; Aug. 3, 2018 (Aug. 3, 2018); pp. 197-208,XP085477958; Total 12 Pages.

* cited by examiner

METHOD AND APPARATUS FOR CONFIGURING A NETWORK PARAMETER

CROSS-REFERENCE TO RELATED APPLICATIONS

This application is a continuation of PCT Patent Application No. PCT/CN2020/112322, filed on Aug. 29, 2020, which claims priority to Chinese Patent Application No. 201910867097.9 filed on Sep. 12, 2019, and Chinese Patent Application No. 201911353303.0 filed on Dec. 25, 2019. All of the aforementioned patent applications are hereby incorporated by reference in their entireties.

TECHNICAL FIELD

Embodiments of this application relate to the field of communications technologies, and in particular, to a method and an apparatus for configuring a network parameter.

BACKGROUND

With rapid development of the interne and the continuous enrichment of network services, higher experience is brought to users, while higher requirements are imposed on network transmission. Currently, a throughput and a latency are main indexes of network transmission. Network parameters such as an explicit congestion notification (ECN) waterline for congestion control, a priority-based flow control (PFC) waterline, and a random early detection (RED) packet loss waterline on network devices such as switches and routers play important roles in regulating the throughput and the latency of network transmission. For example, in a Transmission Control Protocol (TCP) network, a throughput and a latency may be regulated by adjusting a RED packet loss waterline or the like of a network device. In a remote direct memory access (RDMA) network, a throughput and a latency may be regulated by adjusting an ECN threshold or the like of a network device.

Therefore, proper network parameter configuration plays an important role in the throughput and the latency of network transmission. The ECN threshold is used as an example. When the ECN threshold is set to relatively high, a buffer queue of a network device is easily caused to continuously accumulate, which increases a data buffer delay, thereby increasing a transmission latency. When the ECN threshold is set to relatively low, the ECN threshold of the network device is easily triggered, which decreases a data forwarding amount, thereby resulting in a low throughput. Currently, network parameters are usually manually configured by experts based on experience. However, as a network environment becomes increasingly complex, and network services and network traffic constantly change, different network traffic models are generated. Therefore, manual configuration cannot adapt to the increasingly complex network environment. For a dynamic network traffic model, how to dynamically adjust and accurately adapt network parameters based on a change of network traffic to ensure network transmission performance has become an urgent problem to be resolved.

SUMMARY

This application provides a method and an apparatus for configuring a network parameter, to dynamically configure a network parameter based on a change of a network transmission characteristic (network traffic model), so that the network parameter is dynamically adapted to a change of network traffic, thereby ensuring network transmission performance.

According to a first aspect, this application provides a method for configuring a network parameter. The method includes: obtaining network statistical data corresponding to a first period, where the network statistical data includes a network transmission characteristic of a network device in the first period and a first value corresponding to a specified network parameter; determining, based on the network statistical data, a second value corresponding to the specified network parameter; and configuring the specified network parameter of the network device in a second period to the second value, where the second period is a period after the first period.

The method for configuring a network parameter described in this application may be implemented by a network device such as a switch or a router, or may be implemented by a component such as a processing chip or a circuit in the network device, or may be implemented by a configuration server that is connected to the network device by using a communications network, or a component such as a processing chip or a circuit in the configuration server. According to the method, based on network statistical data of the network device in a period, a value of the specified network parameter of the network device in a next period is determined and configured, so that the network parameter can be dynamically adjusted and accurately adapted based on a change of network traffic, to dynamically adapt to a network transmission characteristic, thereby ensuring network transmission performance.

In an embodiment, the network transmission characteristic of the network device in the first period includes a throughput of the network device in the first period, and when the throughput of the network device in the first period increases relative to that in an initial period, the initial period is a period before the first period, and the determining, based on the network statistical data, a second value corresponding to the specified network parameter includes: modifying the first value based on a first adjustment direction and a first step length to obtain the second value.

In an embodiment, that the throughput increases is used as a positive feedback, to further adjust the specified network parameter based on the first adjustment direction, which helps increase the throughput of the network device and improve network transmission performance.

In an embodiment, the method further includes: when a throughput of the network device in the second period increases relative to that in the first period, adjusting the first step length based on a first step length increment; and when the throughput of the network device in the second period does not increase relative to that in the first period, adjusting the first step length based on a first step length decrement.

In an embodiment, after the specified network parameter is adjusted, when the throughput of the network device increases, the first step length of the specified network parameter is increased based on the first step length increment, which helps quickly and efficiently match a current network transmission characteristic of the network device, and improve network transmission performance. After the specified network parameter is adjusted, when the throughput of the network device does not increase, the first step length of the specified network parameter is decreased based on the first step length decrement, which helps avoid making a relatively large adjustment to the specified network parameter and affecting network transmission performance.

In an embodiment, the network transmission characteristic of the network device in the first period includes a throughput of the network device in the first period, and when the throughput of the network device in the first period does not increase relative to that in an initial period, the determining, based on the network statistical data, a second value corresponding to the specified network parameter includes: determining an initial value corresponding to the specified network parameter in the initial period; and modifying the initial value based on a second adjustment direction and a second step length to obtain the second value; or modifying the first value based on a first adjustment direction and a first step length to obtain the second value, where the second adjustment direction is opposite to the first adjustment direction, and the initial period is a period before the first period.

In an embodiment, that the throughput does not increase is used as a negative feedback, to stop further adjusting the specified network parameter based on the first adjustment direction, the value of the specified network parameter is restored to a value, corresponding to a previous period, of the network parameter, and the specified network parameter may be adjusted based on the second adjustment direction, which avoids improperly setting the specified network parameter and affecting network transmission performance, for example, avoids a latency increase. Alternatively, when the throughput does not increase, the specified network parameter may be further adjusted based on the first adjustment direction with a probability (for example, 10%), to effectively avoid that configuration of the specified network parameter falls into a local optimal solution.

In an embodiment, when a throughput of the network device in the second period does not increase relative to that in the first period, or a data buffer delay does not decrease and a quantity of data throughput channels does not increase, the specified network parameter of the network device in a third period is configured to the first value, where the third period is a period after the second period.

In an embodiment, that the throughput does not increase or that the data buffer delay does not decrease and the quantity of data throughput channels does not increase is used as a negative feedback, to stop adjusting the specified network parameter based on the second adjustment direction, and the value of the specified network parameter is restored to a value, corresponding to a previous period, of the network parameter, which avoids improperly setting the specified network parameter and affecting network transmission performance, for example, avoids a low throughput.

In an embodiment, the method further includes: when the throughput of the network device in the second period does not decrease relative to that in the first period, and the data buffer delay decreases or the quantity of data throughput channels increases, adjusting the second step length based on a second step length increment; and when the throughput of the network device in the second period decreases relative to that in the first period, or the data buffer delay does not decrease and the quantity of data throughput channels does not increase, adjusting the second step length based on a second step length decrement.

In an embodiment, after the specified network parameter is adjusted, when the throughput of the network device does not decrease, and the data buffer delay decreases or the quantity of data throughput channels increases, the second step length of the specified network parameter is increased based on the second step length increment, which helps quickly and efficiently match a current network transmission characteristic of the network device, and improve network transmission performance. After the specified network parameter is adjusted, when the throughput of the network device decreases, or the data buffer delay does not decrease and the quantity of data throughput channels does not increase, the second step length of the specified network parameter is decreased based on the second step length decrement, which helps avoid making a relatively large adjustment to the specified network parameter and affecting network transmission performance.

In an embodiment, before the obtaining network statistical data corresponding to a first period, the method further includes: determining that a plurality of consecutive calculated throughput differences are less than a throughput fluctuation threshold. The foregoing design helps avoid interference caused by factors such as a traffic fluctuation to the network statistical data obtained by the network device, and ensure accuracy and reliability of network parameter configuration.

According to a second aspect, this application provides a communications apparatus. The apparatus has a function of implementing the method in any one of the first aspect or the possible designs of the first aspect. The function may be implemented by hardware, or may be implemented by hardware by executing corresponding software. The hardware or the software includes one or more modules corresponding to the function, for example, a transceiver unit and a processing unit.

In an embodiment, the apparatus may be a chip or an integrated circuit.

In an embodiment, the apparatus includes a memory and a processor. The memory is configured to store a program executed by the processor. When the program is executed by the processor, the apparatus may perform functions in any one of the first aspect or the possible designs of the first aspect.

In an embodiment, the apparatus may be a network device such as a switch or a router.

According to a third aspect, this application further provides a network device. The network device has a function of implementing behavior of the network device in any one of the first aspect or the possible designs of the first aspect. The function may be implemented by hardware, or may be implemented by hardware by executing corresponding software. The hardware or the software includes one or more modules corresponding to the foregoing function.

In an embodiment, a structure of the apparatus includes a communications interface, a processor, and a memory. The communications interface is configured to receive and send data. The processor is configured to support the processing device in performing a corresponding function in the first aspect or any one of possible designs of the first aspect. The memory is coupled to the processor, and the memory stores program instructions and data that are necessary for the network device.

According to a fourth aspect, this application provides a computer-readable storage medium. The storage medium stores computer instructions. When the computer instructions are executed, the method in any one of the first aspect or the possible designs of the first aspect may be implemented.

According to a fifth aspect, this application further provides a computer program product, including a computer program or instructions. When the computer program or the instructions are executed, the method in any one of the first aspect or the possible designs of the first aspect may be implemented.

According to a sixth aspect, this application further provides a chip. The chip is configured to implement the method in any one of the first aspect or the possible designs of the first aspect.

For technical effects that can be achieved in the second aspect to the sixth aspect, refer to technical effects that can be achieved in the first aspect.

DESCRIPTION OF EMBODIMENTS

Figure 1:
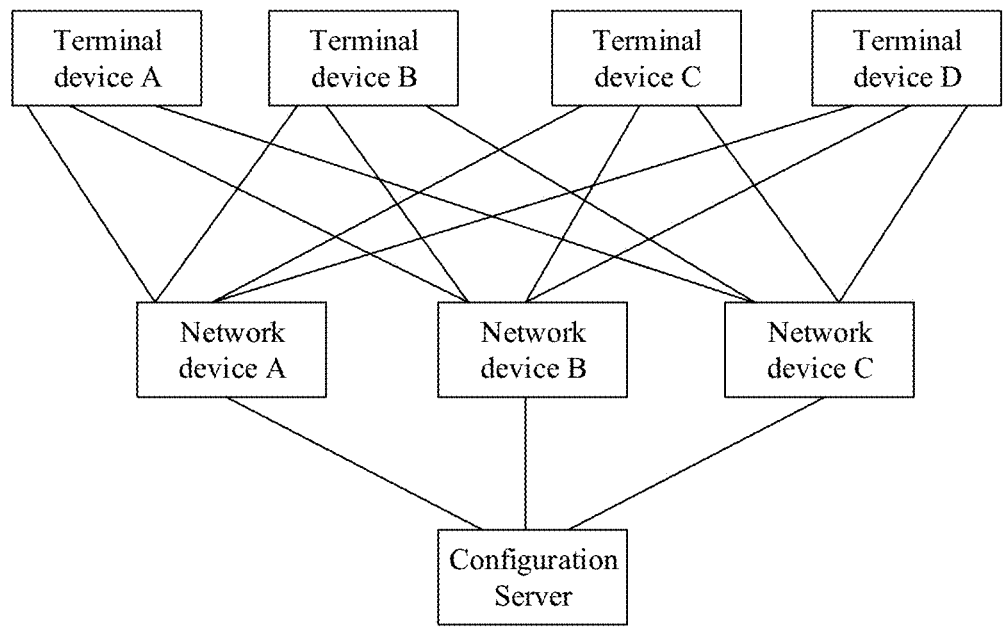
FIG. 1 is a schematic diagram of a communications architecture according to an embodiment of this application.

FIG. 1 is an example of a schematic diagram of a possible communications system architecture according to an embodiment of this application, including a plurality of terminal devices and a plurality of network devices. The plurality of terminal devices may communicate with each other in TCP, RDMA, or other manners by using one or more network devices. The network device may continuously adjust (configure) a network parameter for congestion control of the network device based on network statistical data (such as a network throughput) in one or more periods, so that the network parameter in the network device can be dynamically adjusted and accurately adapted based on a change of network traffic, to ensure network transmission performance.

In an embodiment, the communications system architecture shown in FIG. 1 may further include a configuration server. The configuration server may be interconnected with one or more network devices by using a communications network. The communications network may be a local area network, or may be a wide area network including a relay device, or includes the local area network and the wide area network. Alternatively, the network device may send network statistical data of the network device in one or more periods to the configuration server, and the configuration server continuously adjusts (configures) a network parameter for congestion control of the network device based on the network statistical data of the network device in the one or more periods, and sends the network parameter to the network device, so that the network parameter in the network device can be dynamically adjusted and accurately adapted based on a change of network traffic, to ensure network transmission performance.

Before the embodiments of this application are described, some terms in this application are first described, to help one of ordinary skilled in the art have a better understanding.

(1) Remote direct memory access (RDMA): It is a direct memory access technology, in which data is directly and quickly moved from a memory of one terminal device to a memory of another terminal device by using a network, to eliminate impact on processor performance. A main process of RDMA is as follows: A first terminal device directly sends, by using a network adapter of the first terminal device, data in a memory of the first terminal device to a network device such as a switch or a router in a network. The network device forwards the data to a second terminal device. A network adapter of the second terminal device directly stores received data into a memory of the second terminal device. In this way, processors of the two terminal devices do not need to participate in a data access process, thereby reducing impact on processor performance of the terminal devices. Such network communication allowing a high throughput and a low latency is particularly suitable for use in a large-scale parallel computer cluster.

(2) Network device: It is a device having a data exchange (forwarding) function, and may be a switch, a device such as a router or a gateway, or another apparatus or device having a data exchange function. This is not limited in the embodiments of this application.

(3) Terminal device: It is a device having a transceiver function, and may be, for example, a handheld device, an in-vehicle device or a wearable device having a wireless/wired connection function, a computing device, a service server, a mobile station (MS) or another processing device connected to a wireless modem, or a mobile terminal that communicates with one or more core networks by using an access network.

(4) Throughput: It refers to an amount of data successfully transmitted by a network, a device, a port, a virtual circuit, or other facilities in a unit time (measured in bits, bytes, packets, or the like).

(5) Data buffer delay: It refers to a delay caused by a buffer of a network device to transmission of data, whose value is generally an average time required for the data to be transmitted from one end (an ingress of a buffer queue) to the other end (an egress of the buffer queue) of the buffer queue of the network device.

(6) Data throughput channel: A network device may provide one or more buffer queues for data transmission (forwarding), and each buffer queue provided by the network device for data transmission is a data throughput channel of the network device. Generally, for a given buffer of the network device, as an average buffer occupied by the data buffer queues increases, a quantity of data throughput channels of the network device decreases; on the contrary, as the average buffer occupied by the data buffer queues decreases, the quantity of data throughput channels of the network device increases.

Figure 2:
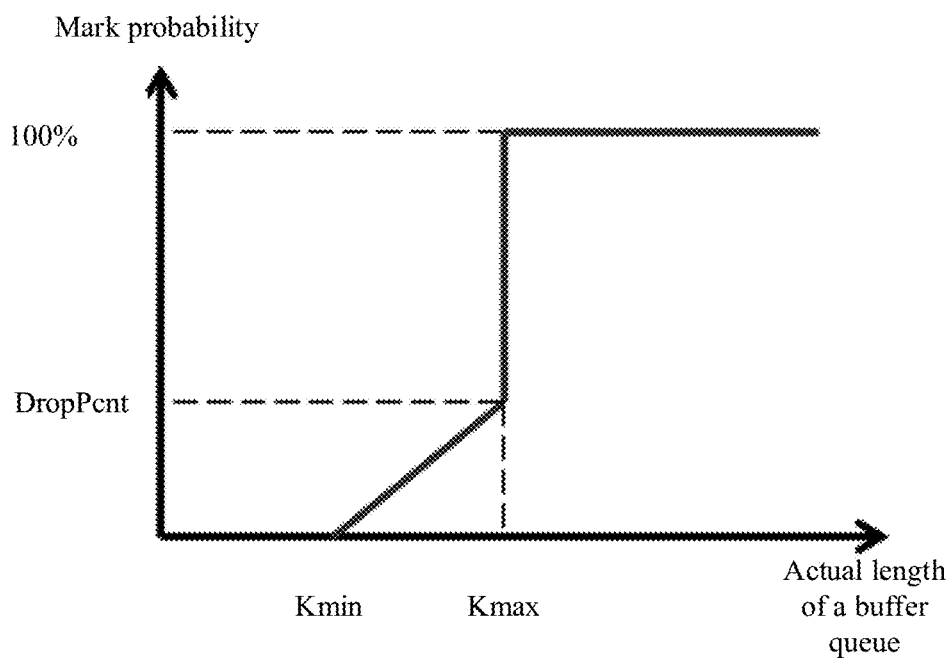
FIG. 2 is a schematic diagram of an ECN mechanism according to an embodiment of this application.

(7) Explicit congestion notification (ECN) mechanism: Refer to FIG. 2. A network device may configure an ECN high threshold (Kmax), an ECN low threshold (Kmin), and an ECN mark probability (DropPcnt). The ECN mark probability may also be referred to as a maximum mark probability. The mark probability is defined by two thresholds of a buffer queue length in the network device, namely, the ECN high threshold and the ECN low threshold. When a length of a buffer queue is less than the ECN low threshold, a data packet passing through the network device is not ECN-marked (which is equivalent to that an actual mark probability is 0). When the length of the buffer queue is greater than the ECN high threshold, all packets passing through the network device are ECN-marked (which is equivalent to that an actual mark probability is 1). When the length of the buffer queue is not less than the ECN low threshold and not greater than the ECN high threshold, packets passing through the network device are ECN-marked with a probability that increases linearly with an actual length of the buffer queue of the network device. The mark probability is generally $$(K - K\text{min}) * \frac{DropPcnt}{K\text{max} - K\text{min}}.$$

K is the actual length of the buffer queue of the network device.

When it is found that received data packets forwarded by using the network device include an ECN-marked data packet, a receive end device (a receive end of the data packet) immediately generates a congestion notification packet (CNP), and sends the congestion notification packet to a transmit end device (a transmit end of the data packet). When the CNP is received, the transmit end device correspondingly decreases a data packet transmission rate based on information such as an ECN mark probability, included in the CNP, of the data packet, to relieve network congestion of the network device, to avoid a data packet loss. Generally, as the ECN high threshold increases, the ECN low threshold increases, or the ECN mark probability decreases, a throughput of the network device increases, which, however, causes queue congestion and a latency increase; on the contrary, as the ECN high threshold decreases, the ECN low threshold decreases, or the ECN mark probability increases, queue congestion is relieved and a latency decreases, which, however, easily causes a throughput loss.

(8) Priority-based flow control (PFC) mechanism: It is a queue-based backpressure mechanism. Generally, a network device is configured with a PFC waterline. When a buffer queue length in the network device reaches the PFC waterline, a pause frame is sent to an upstream device, to instruct the upstream device to pause sending of a data packet. When the buffer queue length in the network device is less than the PFC waterline, a PFC resume packet is sent to the upstream device, to instruct the upstream device to resume sending of a data packet, to avoid a data packet loss.

This application aims to adjust a network parameter such as the ECN high threshold, the ECN low threshold, the ECN mark probability, or the PFC waterline by dynamically adapting to a network transmission characteristic, so that the network parameter is dynamically adjusted and accurately adapted based on a change of network traffic, and a latency is decreased while a throughput is maximized, thereby ensuring network transmission performance.

The following describes in detail the embodiments of this application with reference to the accompanying drawings. In the embodiments of this application, "at least one" may also be "one or more", and "a plurality of" may be two, three, four, or more. This is not limited in this application.

In an embodiment of the application, "/" may represent an "or" relationship between associated objects, for example, A/B may represent A or B; "and/or" may be used to describe three relationships between associated objects, for example, A and/or B may represent the following three cases: only A exists, both A and B exist, and only B exists. A and B may be singular or plural. For ease of describing the technical solutions in the embodiments of this application, in the embodiments of this application, wording such as "first" and "second" may be used to distinguish technical features having same or similar functions. Terms such as "first" and "second" do not limit a quantity and an execution sequence, and the terms such as "first" and "second" do not indicate a definite difference. In the embodiments of this application, a word such as "example" or "for example" is used to represent giving an example, an illustration, or a description. Any embodiment or design described as "example" or "for example" should not be explained as being more preferred or advantageous over other embodiments or designs. Exactly, use of the word such as "example" or "for example" is intended to present a relative concept in a manner for ease of understanding.

A network parameter configuration process provided in the embodiments of this application is described below with reference to a scenario in which a network device configures ECN network parameters (an ECN high threshold, an ECN low threshold, and an ECN mark probability) of the network device.

Figure 3:
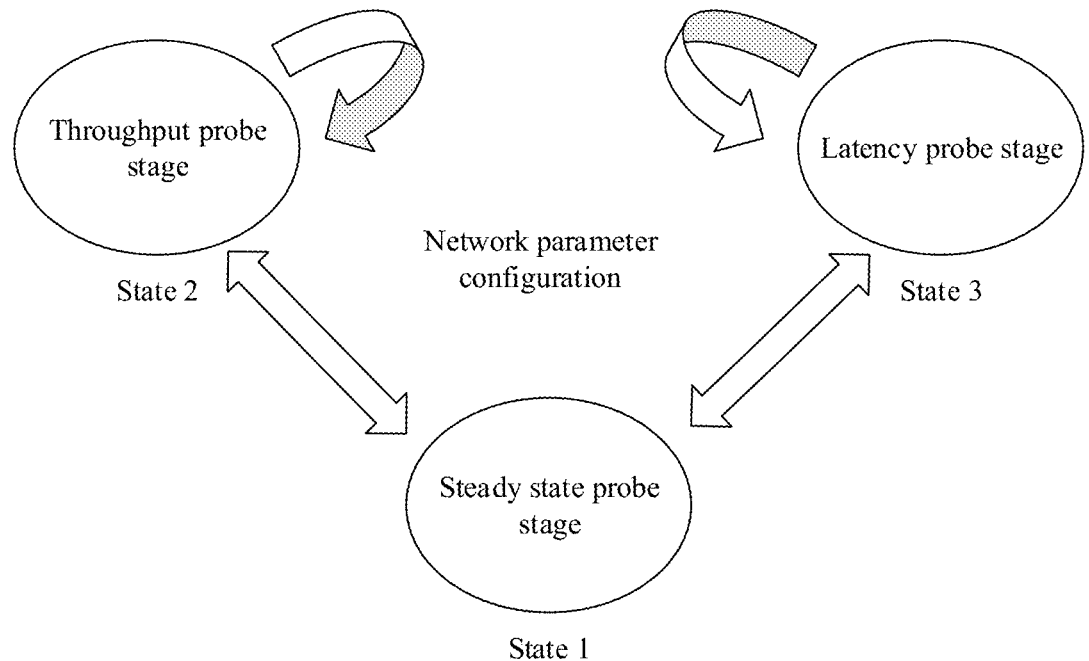
FIG. 3 is a schematic diagram of a network parameter configuration algorithm according to an embodiment of this application.
Figure 4:
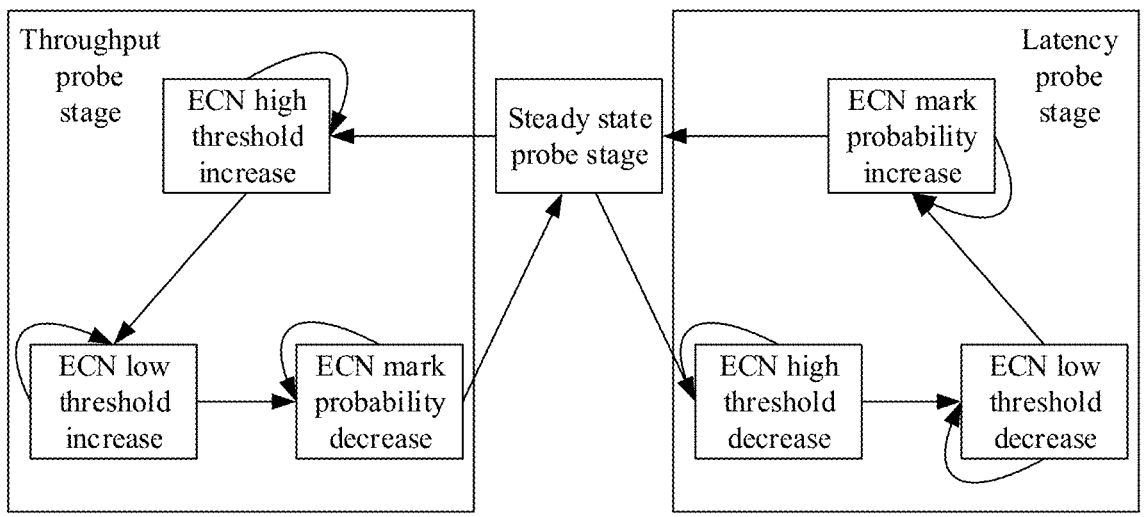
FIG. 4 is a schematic diagram of implementation of a finite state machine of a network parameter configuration algorithm according to an embodiment of this application.

Refer to FIG. 3 and FIG. 4. An ECN network parameter configuration process may include three stages (states): a steady state probe stage, a throughput probe stage (Probe_BW), and a latency probe stage (Probe_RTT). Switching between different stages (states) may be implemented by using a finite state machine. Steady state probe stage (state 1): A throughput is detected, and when it is detected that the throughput of the network device is in a steady state (is steady), the network device enters the throughput probe stage or the latency probe stage. Throughput probe stage (state 2): The ECN high threshold (Kmax) and the ECN low threshold (Kmin) are stimulated to increase, and the ECN mark probability (DropPcnt) is stimulated to decrease, until the throughput reaches an upper limit, and the network device returns to the steady state probe stage. Latency probe stage (state 3): That "when the throughput does not decrease, a data buffer delay decreases or a quantity of data throughput channels increases" is used as a positive feedback, to stimulate the ECN high threshold and the ECN low threshold to decrease, and stimulate the ECN mark probability to increase, until a minimum data buffer delay and/or a maximum quantity of data throughput channels is reached, and the network device returns to the steady state probe stage. The finite state machine is a mathematical model representing a finite quantity of stages (states) and behavior such as transition and/or actions between these stages. In the embodiments of this application, transition between the steady state probe stage, the throughput probe stage, and the latency probe stage may be implemented by using the finite state machine. For example, in the steady state probe stage, the throughput is detected, and when it is detected that the throughput of the network device is in a steady state, the network device enters the throughput probe stage or the latency probe stage, thereby implementing transition from the steady state probe stage to the throughput probe stage or the latency probe stage.

In an embodiment, when running, the network device may divide a running time of the network device into a plurality of periods, and obtain network statistical data respectively corresponding to the plurality of periods. Then the network device may determine and configure the ECN high threshold, the ECN low threshold, and the ECN mark probability based on network statistical data in different periods, so that the ECN high threshold, the ECN low threshold, and the ECN mark probability are dynamically adapted to a current network transmission characteristic (network traffic model) of the network device, thereby ensuring network transmission performance. Durations corresponding to the plurality of periods obtained by the network device through division may be the same, or may be different. This is not limited in the embodiments of this application.

In an example, the network device may divide the running time of the network device based on a given duration (or period), to obtain a plurality of periods. Network statistical data obtained by the network device for any period includes network transmission characteristics of the network device in the period, such as a quantity of forwarded bytes, an average depth of a buffer queue, a timestamp of a sent packet, a throughput, and a quantity of data throughput channels. The throughput of the network device in the period may be determined based on a ratio of the quantity of forwarded bytes of the network device in the period to a duration of the period (such as a difference between a maximum timestamp and a minimum timestamp of packets sent in the period). The network statistical data may further include values corresponding to network parameters such as the ECN high threshold, the ECN low threshold, and the ECN mark probability of the network device in the period.

ECN network parameter configuration is described below with reference to configuration stages.

1. Steady State Probe Stage

To avoid interference caused by factors such as a traffic fluctuation to network statistical data obtained by the network device, and ensure accuracy and reliability of ECN network parameter configuration, when the network device configures the ECN network parameters, the network device first calculates, based on throughputs of the network device in a plurality of consecutive periods, whether a throughput difference of the network device between two adjacent periods is less than a throughput fluctuation threshold for a plurality of consecutive times, to probe whether traffic of the network device enters a steady state. If a plurality of consecutive calculated throughput differences are greater than or equal to the throughput fluctuation threshold, it indicates that traffic passing through the network device has a relatively large fluctuation, which may cause much interference to determining and configuration of the ECN network parameters. The network device keeps the ECN network parameters unchanged, and further calculates whether a throughput difference of the network device between two adjacent periods is less than the throughput fluctuation threshold for a plurality of consecutive times.

If a plurality of consecutive calculated throughput differences are less than the throughput fluctuation threshold, it indicates that traffic of the network device is relatively steady and has entered a steady state stage, and factors such as a traffic fluctuation do not cause much interference to determining and configuration of the ECN network parameters. Then the network device enters the throughput probe stage or the latency probe stage.

In an embodiment, after determining that the traffic enters the steady state stage, the network device selects the throughput probe stage and the latency probe stage in polling mode, that is, stages selected from the throughput probe stage and the latency probe stage after two adjacent steady state stages are different. For example, the throughput probe stage is selected after a steady state stage, and the latency probe stage is selected after a next steady state stage.

In an embodiment, when there are a plurality of ECN network parameters, for example, the ECN high threshold, the ECN low threshold, and the ECN mark probability, the network device may sequentially configure (adjust) the ECN high threshold, the ECN low threshold, and the ECN mark probability in a sequence of first configuring the ECN high threshold, then configuring the ECN low threshold, and finally configuring the ECN mark probability. It should be understood that, when there are a plurality of ECN network parameters, a sequence of configuring the plurality of ECN network parameters is not limited in the embodiments of this application. For example, the network device may alternatively first configure the ECN low threshold, then configure the ECN high threshold, and finally configure the ECN mark probability.

2. Throughput Probe Stage

Figure 5:
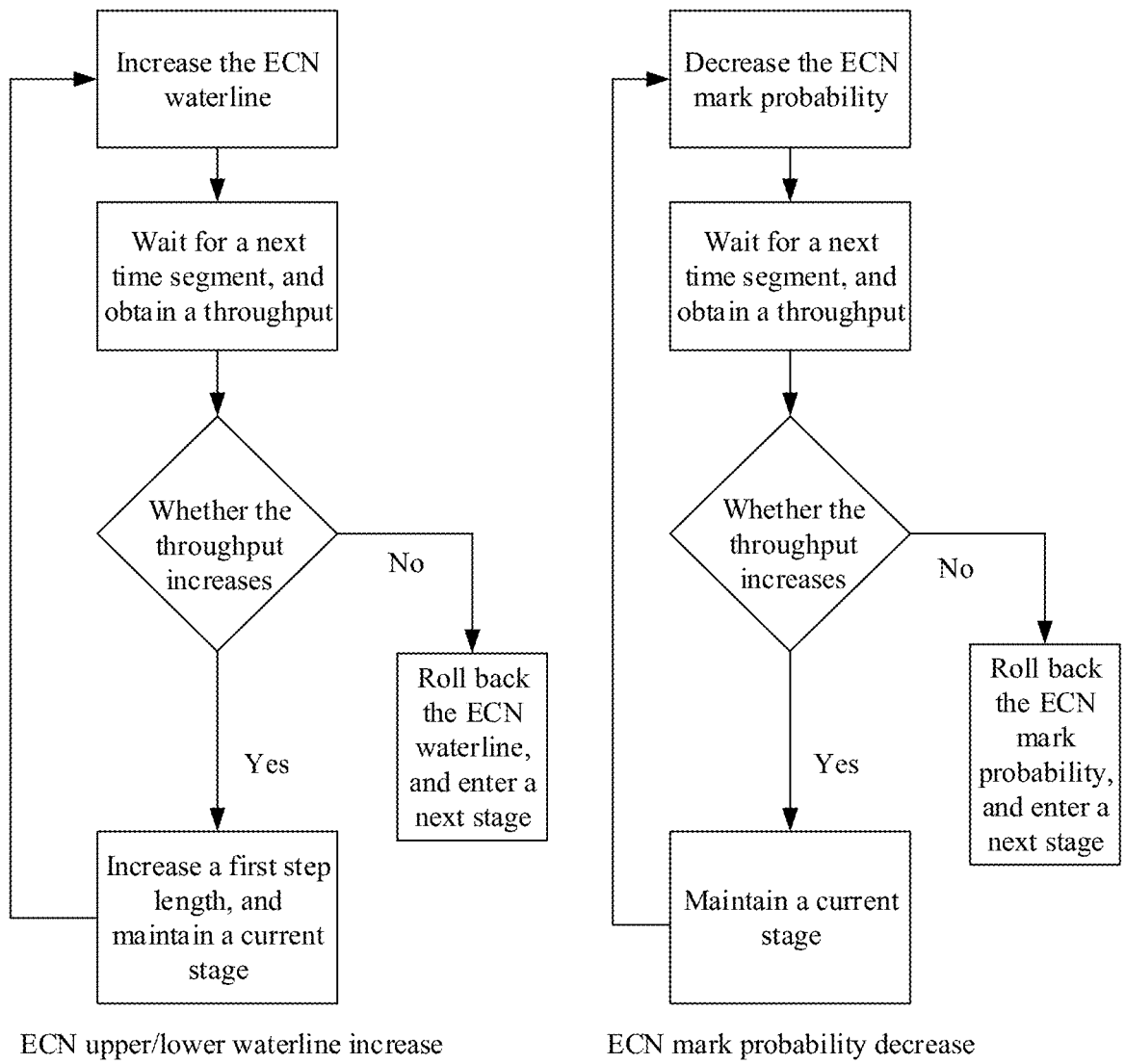
FIG. 5 is a schematic diagram of implementation of a throughput probe stage according to an embodiment of this application.

Refer to FIG. 5. For configuration of the ECN high threshold:

The network device may first increase a value of the ECN high threshold in a next period based on a first step length corresponding to the ECN high threshold, and wait to enter the next period. After the network device enters the next period, the next period is used as a current period of the network device, and the network device obtains network statistical data in the current period, and determines a throughput of the network device in the current period. The first step length corresponding to the ECN high threshold may be 20%, 30%, 50%, or the like of a value of a default ECN high threshold.

After determining the throughput of the network device in the current period, the network device compares the throughput in the current period with a throughput in a previous period. If the throughput of the network device in the current period increases relative to that in the previous period, the network device further increases a value of the ECN high threshold in a next period based on the first step length corresponding to the ECN high threshold. If the throughput of the network device in the current period does not increase relative to that in the previous period, the network device may set the value of the ECN high threshold in the next period to a value, corresponding to the previous time segment, of the ECN high threshold, and enter the steady state probe stage.

In an embodiment, to avoid that configuration of the ECN high threshold falls into a local optimal solution, if the throughput of the network device in the current period does not increase relative to that in the previous period, the network device may alternatively further increase the value of the ECN high threshold in the next period based on the first step length corresponding to the ECN high threshold with a probability of alpha1, set the value of the ECN high threshold in the next period to the value, corresponding to the previous time segment, of the ECN high threshold with a probability of (1−alpha1), and enter the steady state probe stage, where alpha1 is not greater than 1. In an embodiment, alpha1 is not greater than 50%. For example, alpha1 is 10% or 15%. Certainly, a value of alpha1 may be randomly selected within a value range (for example, 5% to 30%), or dynamically decreased or increased within a value range (for example, decreased within a value range as the value of the ECN high threshold increases).

In an embodiment, to ensure that the ECN high threshold quickly and efficiently matches a current network traffic model of the network device, if the throughput of the network device in the current period increases relative to that in the previous period, the network device may further increase the first step length corresponding to the ECN high threshold, for example, adjust the first step length from 40% of the value of the default ECN high threshold to 60% of the value of the default ECN high threshold. If the throughput of the network device in the current period does not increase relative to that in the previous period, the network device may further decrease the first step length corresponding to the ECN high threshold, for example, decrease the first step length from 40% of the value of the default ECN high threshold to 20% of the value of the default ECN high threshold.

Configuration of the ECN low threshold is similar to the configuration of the ECN high threshold. For the configuration of the ECN low threshold, refer to the foregoing process of configuring the ECN high threshold.

For configuration of the ECN mark probability:

The network device may first decrease a value of the ECN mark probability in a next period based on a first step length corresponding to the ECN mark probability, and wait to enter the next period. After the network device enters the next period, the next period is used as a current period of the network device, and the network device obtains network statistical data of the network device in the current period, and determines a throughput of the network device in the current period. The first step length corresponding to the ECN mark probability may be 0.1, 0.2, or the like.

After determining the throughput of the network device in the current period, the network device compares the throughput in the current period with a throughput in a previous period. If the throughput of the network device in the current period increases relative to that in the previous period, the network device further decreases a value of the ECN mark probability in a next period based on the first step length corresponding to the ECN mark probability. If the throughput of the network device in the current period does not increase relative to that in the previous period, the network device may set the value of the ECN mark probability in the next period to a value, corresponding to the previous time segment, of the ECN mark probability, and enter the steady state probe stage.

In an embodiment, to avoid that configuration of the ECN mark probability falls into a local optimal solution, if the throughput of the network device in the current period does not increase relative to that in the previous period, the network device may alternatively further decrease the value of the ECN mark probability in the next period based on the first step length corresponding to the ECN mark probability with a probability of alpha2, set the value of the ECN mark probability in the next period to the value, corresponding to the previous time segment, of the ECN mark probability with a probability of (1−alpha2), and enter the steady state probe stage, where alpha2 is not greater than 1. In an embodiment, alpha2 is not greater than 50%. For example, alpha2 is 10% or 15%. Certainly, a value of alpha2 may be randomly selected within a value range (for example, 5% to 30%), or dynamically decreased or increased within a value range (for example, decreased within a value range as the value of the ECN mark probability decreases).

3. Latency Probe Stage

Figure 6:
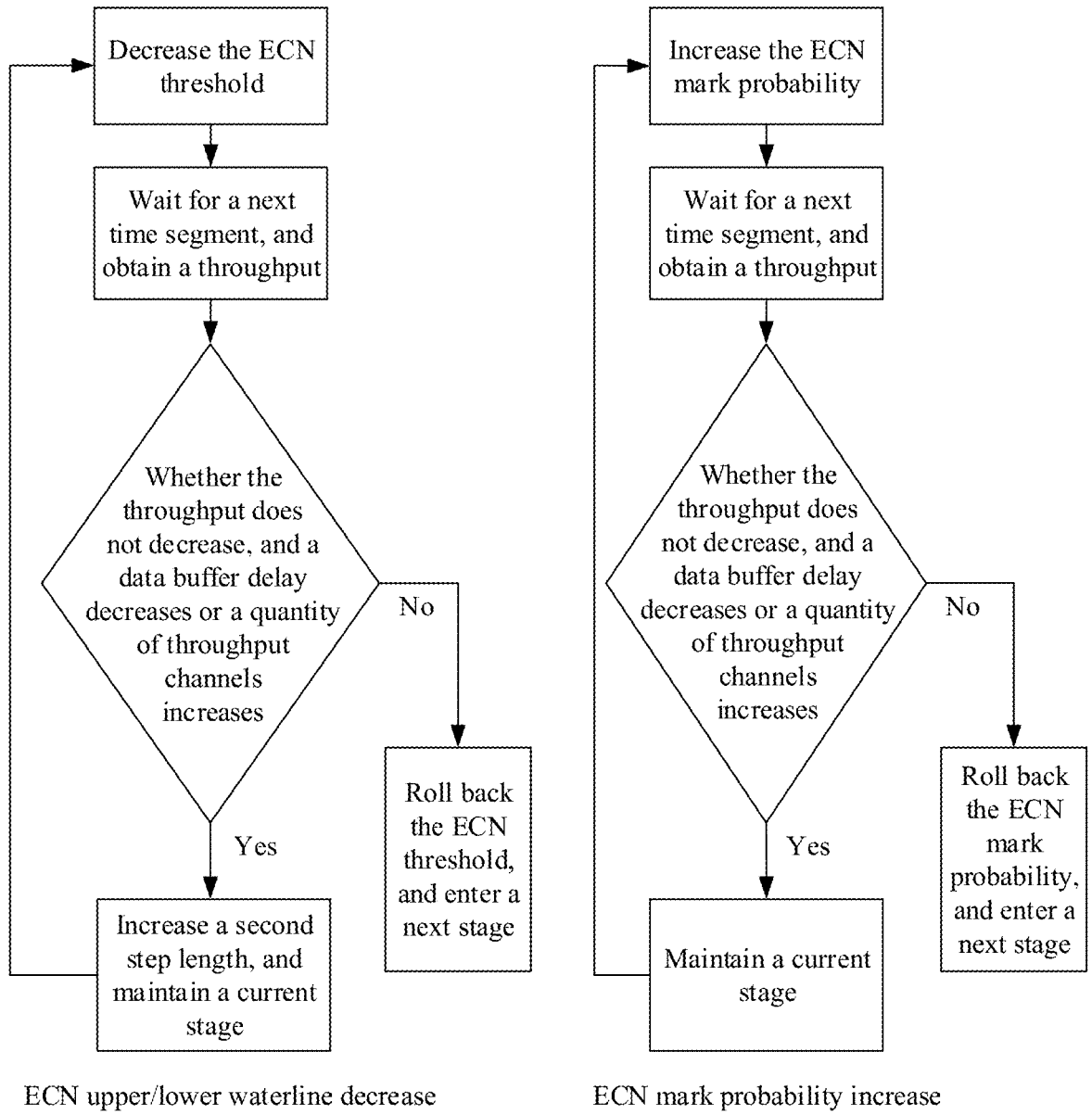
FIG. 6 is a schematic diagram of implementation of a latency probe stage according to an embodiment of this application.

Refer to FIG. 6. For configuration of the ECN high threshold:

The network device may first decrease a value of the ECN high threshold in a next period based on a second step length corresponding to the ECN high threshold, and wait to enter the next period. After the network device enters the next period, the next period is used as a current period of the network device, and the network device obtains network statistical data in the current period, and determines a throughput, a data buffer delay, and a quantity of data throughput channels of the network device in the current period. The second step length corresponding to the ECN high threshold may be the same as or different from the first step length corresponding to the ECN high threshold, for example, may be 20%, 30%, or 40% of the default ECN high threshold.

After determining the throughput, the data buffer delay, and the quantity of data throughput channels of the network device in the current period, the network device compares the throughput, the data buffer delay, and the quantity of data throughput channels in the current period with those in the previous period. If based on the comparison between the current period and the previous period, the throughput of the network device does not decrease, and the data buffer delay decreases or the quantity of data throughput channels increases, the network device further decreases a value of the ECN high threshold in a next period based on the second step length corresponding to the ECN high threshold. If based on the comparison between the current period and the previous period, the throughput of the network device decreases, or the data buffer delay does not decrease and the quantity of data throughput channels does not increase, the network device may set the value of the ECN high threshold of the network device in the next period to a value, corresponding to the previous time segment, of the ECN high threshold, and enter the steady state probe stage.

In an embodiment, to avoid that configuration of the ECN high threshold falls into a local optimal solution, if based on the comparison between the current period and the previous period, the throughput of the network device decreases, or the data buffer delay does not decrease and the quantity of data throughput channels does not increase, the network device may alternatively further decrease the value of the ECN high threshold in the next period based on the second step length corresponding to the ECN high threshold with a probability of alpha3, set the value of the ECN high threshold in the next period to the value, corresponding to the previous time segment, of the ECN high threshold with a probability of (1−alpha3), and enter the steady state probe stage, where alpha3 is not greater than 1. In an embodiment, alpha3 is not greater than 50%. For example, alpha3 is 10% or 20%. Certainly, a value of alpha3 may be randomly selected within a value range (for example, 5% to 25%), or dynamically decreased or increased within a value range (for example, decreased within a value range as the value of the ECN high threshold decreases).

In an embodiment, to ensure that the ECN high threshold quickly and efficiently matches a current network traffic model of the network device, if based on the comparison between the current period and the previous period, the throughput of the network device does not decrease, and the data buffer delay decreases or the quantity of data throughput channels increases, the network device may further increase the second step length corresponding to the ECN high threshold, for example, adjust the first step length from 40% of the value of the default ECN high threshold to 60% of the value of the default ECN high threshold. If based on the comparison between the current period and the previous period, the throughput of the network device decreases, or the data buffer delay does not decrease and the quantity of data throughput channels does not increase, the network device may further decrease the second step length corresponding to the ECN high threshold, for example, decrease the second step length from 40% of the value of the default ECN high threshold to 20% of the value of the default ECN high threshold.

Adjustment of the ECN low threshold is similar to the adjustment of the ECN high threshold. For the adjustment of the ECN low threshold, refer to the foregoing process of adjusting the ECN high threshold.

For configuration of the ECN mark probability:

The network device may first increase a value of the ECN mark probability in a next period based on a second step length corresponding to the ECN mark probability, and wait to enter the next period. After the network device enters the next period, the next period is used as a current period of the network device, and the network device obtains network statistical data in the current period, and determines a throughput, a data buffer delay, and a quantity of data throughput channels of the network device in the current period. The second step length corresponding to the ECN mark probability may be the same as or different from the first step length corresponding to the ECN mark probability, for example, may be 0.1 or 0.2.

After determining the throughput, the data buffer delay, and the quantity of data throughput channels of the network device in the current period, the network device compares the throughput, the data buffer delay, and the quantity of data throughput channels in the current period with those in the previous period. If based on the comparison between the current period and the previous period, the throughput of the network device does not decrease, and the data buffer delay decreases or the quantity of data throughput channels increases, the network device further increases a value of the ECN mark probability in a next period based on the second step length corresponding to the ECN mark probability. If based on the comparison between the current period and the previous period, the throughput of the network device decreases, or the data buffer delay does not decrease and the quantity of data throughput channels does not increase, the network device may set the value of the ECN mark probability in the next period to a value, corresponding to the previous time segment, of the ECN mark probability, and enter the steady state probe stage.

In an embodiment, to avoid that configuration of the ECN mark probability falls into a local optimal solution, if based on the comparison between the current period and the previous period, the throughput of the network device does not decrease, and the data buffer delay decreases or the quantity of data throughput channels increases, the network device may alternatively further increase the value of the ECN mark probability in the next period based on the second step length corresponding to the ECN mark probability with a probability of alpha4, set the value of the ECN mark probability in the next period to the value, corresponding to the previous time segment, of the ECN mark probability with a probability of (1−alpha4), and enter the steady state probe stage, where alpha4 is not greater than 1. In an embodiment, alpha4 is not greater than 50%. For example, alpha4 is 10% or 20%. Certainly, a value of alpha4 may be randomly selected within a value range (for example, 5% to 30%), or dynamically decreased or increased within a value range (for example, decreased within a value range as the value of the ECN mark probability increases).

Figure 7:
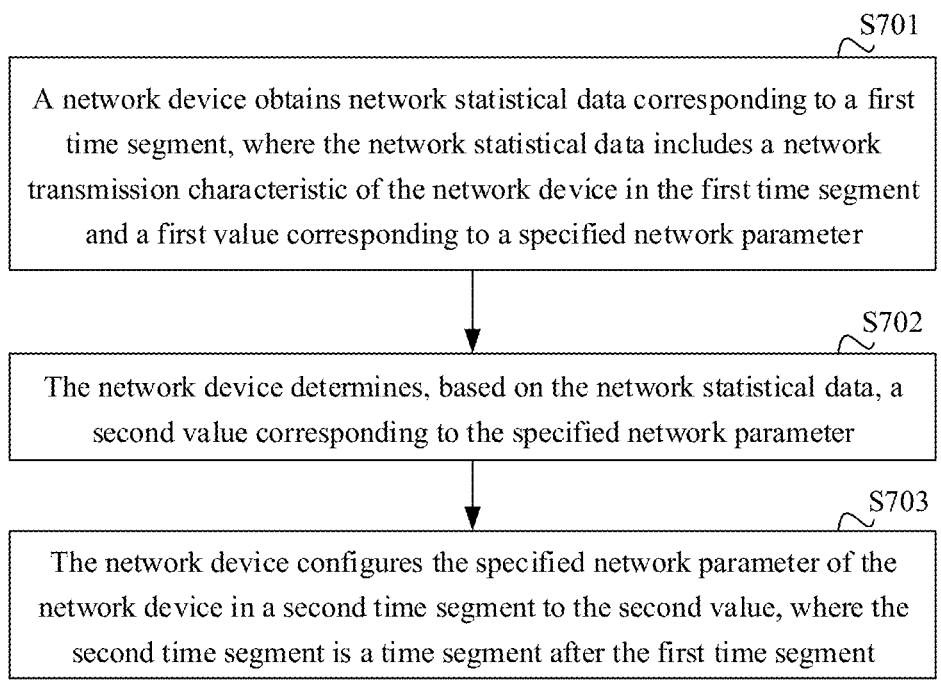
FIG. 7 is a schematic diagram of a network parameter configuration process according to an embodiment of this application.

The following describes a method for configuring a network parameter provided in an embodiment of this application. The method is applicable to the communications system architecture shown in FIG. 1. For example, a network device configures a network parameter of the network device. Refer to FIG. 7. A procedure of the method includes the following operations.

S701: The network device obtains network statistical data corresponding to a first period, where the network statistical data includes a network transmission characteristic of the network device in the first period and a first value corresponding to a specified network parameter.

In an embodiment of the application, when running, the network device may divide a running time of the network device into a plurality of periods, and collect statistics on network data corresponding to the plurality of periods respectively, to obtain network statistical data including each period. Then the network device may determine and configure a network parameter based on network transmission characteristics in different periods, so that the network parameter is dynamically adapted to a network transmission characteristic of the network device, thereby ensuring network transmission performance. Durations corresponding to the plurality of periods obtained by the network device through division may be the same, or may be different. This is not limited in an embodiment of the application. In an example, the network device may divide the running time of the network device based on a given duration (or period), to obtain a plurality of periods.

In addition, to avoid interference caused by factors such as a traffic fluctuation on the network statistical data obtained by the network device, and ensure accuracy and reliability of network parameter configuration, in an embodiment, before the network device determines and configures the specified network parameter, the network device determines that a plurality of consecutive calculated throughput differences are less than a throughput fluctuation threshold.

In other words, before the network device determines and configures the network parameter, the network device first calculates, based on throughputs of the network device in a plurality of consecutive periods, whether a throughput difference of the network device between two adjacent periods is less than the throughput fluctuation threshold for a plurality of consecutive times, to probe whether traffic of the network device enters a steady state. If a plurality of consecutive calculated throughput differences are less than the throughput fluctuation threshold, it indicates that traffic of the network device is relatively steady and has entered a steady state, and factors such as a traffic fluctuation do not cause much interference to determining and configuration of the specified network parameter. Then the network device determines and configures the specified network parameter.

After the network device determines that a plurality of consecutive calculated throughput differences are less than the throughput fluctuation threshold, the network device may modify a value of the specified network parameter based on a first adjustment direction and a first adjustment step length, and configure a value of the specified network parameter in a next period to the value modified based on the first adjustment direction and the first adjustment step length. In addition, after determining that a plurality of consecutive calculated throughput differences are less than the throughput fluctuation threshold, the network device uses each period in which the network device is currently located as a first period of the network device, and obtains network statistical data corresponding to the first period.

In an embodiment of the application, the specified network parameter may include, but is not limited to, one or more of an ECN high threshold, an ECN low threshold, an ECN mark probability, a PFC waterline, a RED packet loss waterline, and a RED packet loss threshold. The network transmission characteristic may include, but is not limited to, one or more of a throughput, a data buffer delay, a quantity of data throughput channels, and the like. The network statistical data that is in the first period and that is obtained by the network device includes a network transmission characteristic of the network device in the first period and a first value corresponding to the specified network parameter.

In addition, it should be understood that, in an embodiment of the application, for different specified network parameters, first adjustment directions, first step lengths, second adjustment directions, second step lengths, or the like used to modify the specified network parameters may be the same, or may be different. For example, when the specified network parameter is the ECN high threshold, the first adjustment direction is increasing and the second adjustment direction is decreasing. When the specified network parameter is the ECN low threshold, the first adjustment direction is increasing and the second adjustment direction is decreasing, which are the same as those of the ECN high threshold. When the specified network parameter is the ECN mark probability, the first adjustment direction is decreasing and the second adjustment direction is increasing, which are different from those of the ECN high threshold.

In an embodiment, the first adjustment direction of the specified network parameter helps improve a throughput of the network device, the second adjustment direction of the specified network parameter helps decrease a data buffer delay of the network device and/or increase a quantity of data throughput channels of the network device, and the first adjustment direction is generally opposite to the second adjustment direction.

S702: The network device determines, based on the network statistical data, a second value corresponding to the specified network parameter.

For example, the network transmission characteristic includes the throughput. In an embodiment, when a throughput of the network device in the first period increases relative to that in an initial period, where the initial period is a period before the first period, it indicates that adjusting the specified network parameter based on the first adjustment direction helps improve the throughput of the network device. The network device modifies, based on the first adjustment direction and the first step length, the first value corresponding to the specified network parameter, to obtain the second value of the network parameter. When the throughput of the network device in the first period does not increase relative to that in the initial period, it indicates that adjusting the specified network parameter based on the first adjustment direction does not help improve the throughput of the network device. The network device may roll back the value corresponding to the specified network parameter to an initial value corresponding to the initial period, and use the initial value corresponding to the initial period as the second value of the specified network parameter. The initial period is a period before the first period.

In addition, to avoid that configuration of the network parameter falls into a local optimal solution, when determining that the throughput in the first period does not increase relative to the throughput in the initial period, the network device may alternatively roll back, based on a first probability (for example, 1−alpha), the value corresponding to the specified network parameter to the initial value corresponding to the initial period and use the initial value corresponding to the initial period as the second value of the specified network parameter; and further modify, based on a second probability (for example, alpha), the first value corresponding to the specified network parameter based on the first adjustment direction and the first step length, to obtain the second value corresponding to the specified network parameter. A value of alpha is not greater than 1. For example, alpha is 10% or 15%.

In an example, when determining that the throughput in the first period does not increase relative to the throughput in the initial period, the network device may roll back, based on the first probability, a value corresponding to the ECN high threshold to an initial value corresponding to the ECN high threshold and use the initial value corresponding to the initial period as a second value of the ECN high threshold; and further modify, based on the second probability, a first value corresponding to the ECN high threshold based on the first adjustment direction and the first adjustment step length, to obtain a second value corresponding to the ECN high threshold. A sum of the first probability and the second probability is 1, which may be configured based on a requirement. For example, the first probability is configured to 90% and the second probability to 10%.

In another possible implementation, when determining that the throughput in the first period does not increase relative to the throughput in the initial period, after the network device rolls back the value corresponding to the specified network parameter to the initial value corresponding to the initial period, the network device may further modify the initial value based on a second adjustment direction and a second step length, to obtain the second value of the specified network parameter, to decrease a data buffer delay of the network device and/or increase a quantity of data throughput channels of the network device.

S703: The network device configures the specified network parameter of the network device in a second period to the second value, where the second period is a period after the first period.

In an embodiment, to ensure that the specified network parameter quickly and efficiently matches a current network transmission characteristic of the network device, after S703, when a throughput of the network device in the second period increases relative to that in the first period, the network device adjusts the first step length based on a first step length increment. When the throughput of the network device in the second period does not increase relative to that in the first period, the network device adjusts the first step length based on a first step length decrement.

In addition, after the network device modifies the value of the specified network parameter based on the second adjustment direction and the second step length to obtain the second value of the specified network parameter, and configures the value of the specified network parameter in the next period (second period) to the second value, when the throughput of the network device in the next period (second period) for which the network device modifies the value of the specified network parameter based on the second adjustment direction and the second step length does not decrease relative to that in the period (first period) before the value of the specified network parameter is modified based on the second adjustment direction and the second step length, and the data buffer delay decreases or the quantity of data throughput channels increases, it indicates that adjusting the specified network parameter based on the second adjustment direction helps decrease the data buffer delay or increase the quantity of data throughput channels. The network device further modifies the value of the specified network parameter (the value, corresponding to the second time segment, of the specified network parameter) based on the second adjustment direction and the second step length, and configures the modified value of the specified network parameter for a period (third period) next to the second period.

When the throughput of the network device in the next period (second period) for which the network device modifies the value of the specified network parameter based on the second adjustment direction and the second step length does not increase relative to that in the period (first period) before the value of the specified network parameter is modified based on the second adjustment direction and the second step length, or the data buffer delay does not decrease and the quantity of data throughput channels does not increase, it indicates that adjusting the specified network parameter based on the second adjustment direction does not help decrease the data buffer delay or increase the quantity of data throughput channels. The network device may roll back the value of the specified network parameter in the period (third period) next to the second period to the value (first value) of the specified network parameter in the previous period (first period).

In an embodiment, to avoid that configuration of the network parameter falls into a local optimal solution, when the throughput of the network device in the next period (second period) for which the network device modifies the value of the specified network parameter based on the second adjustment direction and the second step length does not increase relative to that in the period (first period) before the value of the specified network parameter is modified based on the second adjustment direction and the second step length, or the data buffer delay does not decrease and the quantity of data throughput channels does not increase, the network device may alternatively roll back, based on a third probability, the value of the specified network parameter in the period (third period) next to the second period to the value (first value) of the specified network parameter in the previous period (first period); and further modify, based on a fourth probability, the value of the specified network parameter (the value, corresponding to the second time segment, of the specified network parameter) based on the second adjustment direction and the second step length, and configure the modified value of the specified network parameter for the period (third period) next to the second period. A sum of the third probability and the fourth probability is 1, and may be configured based on a requirement. For example, the third probability is 85% and the fourth probability is 15%.

In an embodiment, to ensure that the specified network parameter quickly and efficiently matches a current network transmission characteristic of the network device, when the throughput of the network device in the second period does not decrease relative to that in the first period, and the data buffer delay decreases or the quantity of data throughput channels increases, the second step length is adjusted based on a second step length increment; and when the throughput of the network device in the second period decreases relative to that in the first period, or the data buffer delay does not decrease and the quantity of data throughput channels does not increase, the second step length is adjusted based on a second step length decrement.

Figure 8:
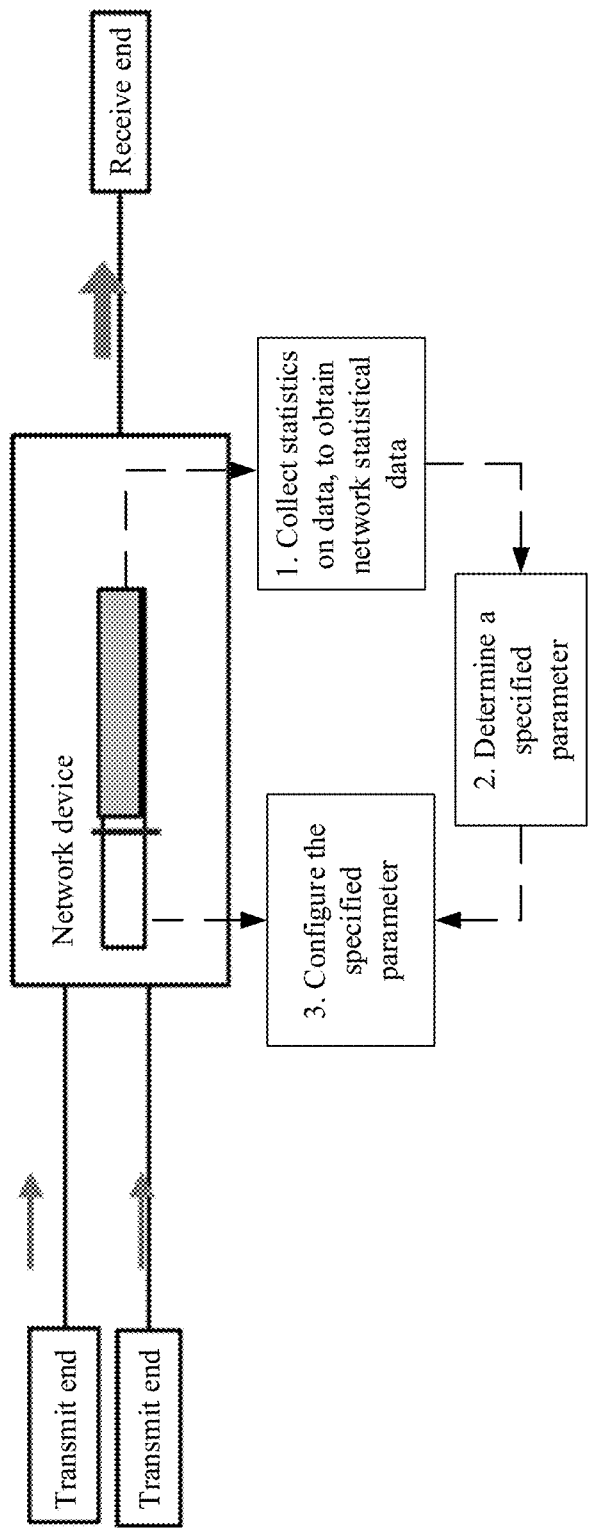
FIG. 8 is a schematic diagram of implementation of network parameter configuration according to an embodiment of this application.

Refer to FIG. 8. In an embodiment of the application, when running, the network device may divide a running time of the network device into a plurality of periods, and collect statistics on network data corresponding to the plurality of periods, to obtain network statistical data including each period. Then a value of a specified network parameter is determined based on network transmission characteristics in different periods, and the determined value of the specified network parameter is configured in the network device, to ensure network transmission performance. For example, the specified network parameter is the ECN high threshold. If a throughput of the network device in a period after the network device increases a value of the ECN high threshold increases relative to that in a period before the value of the ECN high threshold is increased, the network device further increases the value of the ECN high threshold, and configures a value of the ECN high threshold in a next period to a value of the ECN high threshold obtained after the further increase, so that the network device obtains a larger throughput.

In some other embodiments, the network device may alternatively send the network statistical data of the network device in each period to the configuration server, and the configuration server dynamically modifies the value of the specified network parameter of the network device based on the network statistical data of the network device in each period by using the foregoing parameter configuration method, and sends the modified value of the network parameter to the network device, to adapt to a current network transmission characteristic (network traffic model) of the network device, to ensure network transmission performance.

The foregoing mainly describes the solutions provided in the embodiments of this application from the perspective of the network device. It may be understood that to implement the foregoing functions, each network element includes a corresponding hardware structure and/or software module (or unit) for implementing each function. One of ordinary skilled in the art should easily be aware that, in combination with the examples described in the embodiments disclosed in this specification, units and algorithm operations may be implemented by hardware or a combination of hardware and computer software in this application. Whether a function is performed by hardware or hardware driven by computer software depends on a particular application and a design constraint condition of the technical solutions. One of ordinary skilled in the art may use different methods to implement the described functions for each particular application, but it should not be considered that the implementation goes beyond the scope of this application.

Figure 9:
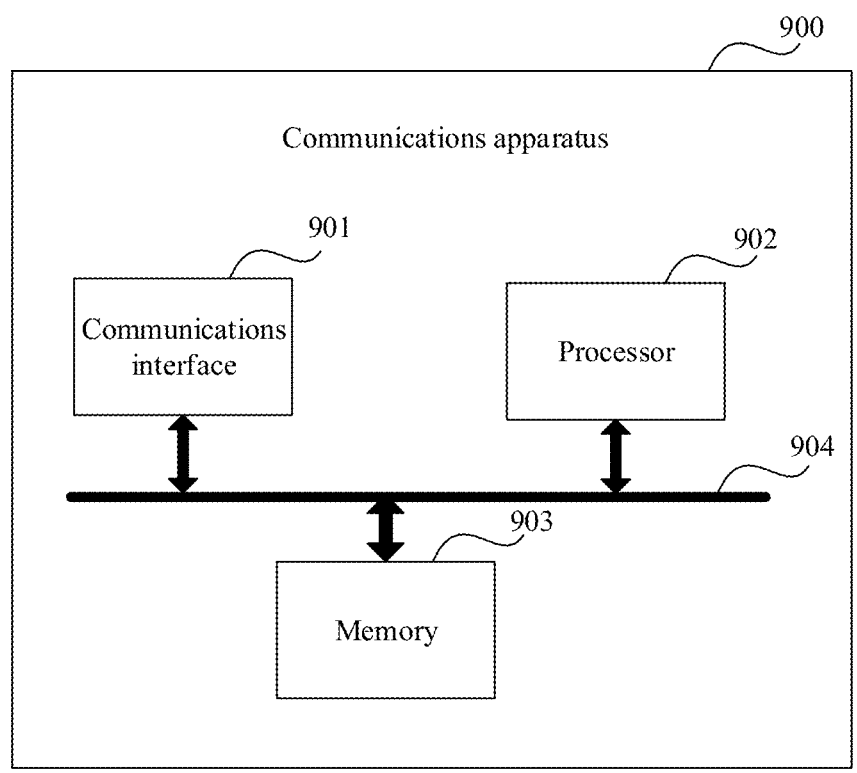
FIG. 9 is a schematic diagram of a structure of a communications apparatus according to an embodiment of this application.

Based on the foregoing embodiment, an embodiment of this application provides a communications apparatus. Refer to FIG. 9. The communications apparatus 900 includes: a communications interface 901, a processor 902, and a memory 903.

The communications interface 901, the processor 902, and the memory 903 are connected to each other. In an embodiment, the communications interface 901, the processor 902, and the memory 903 are interconnected by a bus 904. The bus 904 may be a peripheral component interconnect (PCI) standard bus, an extended industry standard architecture (EISA) bus, or the like. The bus may be classified into an address bus, a data bus, a control bus, and the like. For ease of representation, only one thick line is used to represent the bus in FIG. 9, but this does not mean that there is only one bus or only one type of bus.

When the communications apparatus 900 implements the method for configuring a network parameter shown in FIG. 7, the communications interface 901 is configured to receive and send data; and the processor 902 is configured to invoke program instructions stored in the memory 903, to perform the following method: obtaining, by using the communications interface 901, network statistical data corresponding to a first period, where the network statistical data includes a network transmission characteristic of a network device in the first period and a first value corresponding to a specified network parameter; determining, based on the network statistical data, a second value corresponding to the specified network parameter; and configuring the specified network parameter of the network device in a second period to the second value, where the second period is a period after the first period.

In an embodiment, the network transmission characteristic of the network device in the first period includes a throughput of the network device in the first period, and when the throughput of the network device in the first period increases relative to that in an initial period, the initial period is a period before the first period, and the determining, based on the network statistical data, a second value corresponding to the specified network parameter includes: modifying the first value based on a first adjustment direction and a first step length to obtain the second value.

In an embodiment, the method further includes: when a throughput of the network device in the second period increases relative to that in the first period, adjusting the first step length based on a first step length increment; and when the throughput of the network device in the second period does not increase relative to that in the first period, adjusting the first step length based on a first step length decrement.

In an embodiment, the network transmission characteristic of the network device in the first period includes a throughput of the network device in the first period, and when the throughput of the network device in the first period does not increase relative to that in an initial period, the initial period is a period before the first period, and the determining, based on the network statistical data, a second value corresponding to the specified network parameter includes: determining an initial value corresponding to the specified network parameter in the initial period; and modifying the initial value based on a second adjustment direction and a second step length to obtain the second value; or modifying the first value based on a first adjustment direction and a first step length to obtain the second value.

In an embodiment, the method further includes: when a throughput of the network device in the second period does not increase relative to that in the first period, or a data buffer delay does not decrease and a quantity of data throughput channels does not increase, configuring the specified network parameter of the network device in a third period to the first value, where the third period is a period after the second period.

In an embodiment, the method further includes: when the throughput of the network device in the second period does not decrease relative to that in the first period, and the data buffer delay decreases or the quantity of data throughput channels increases, adjusting the second step length based on a second step length increment; and when the throughput of the network device in the second period decreases relative to that in the first period, or the data buffer delay does not decrease and the quantity of data throughput channels does not increase, adjusting the second step length based on a second step length decrement.

In an embodiment, before the obtaining network statistical data corresponding to a first period, the method further includes: determining, by using the communications interface 901, that a plurality of consecutive calculated throughput differences are less than a throughput fluctuation threshold.

In another form of an embodiment, a computer-readable storage medium is provided. The computer-readable storage medium stores instructions. When the instructions are executed, the methods on a network device side in the foregoing method embodiments may be performed.

In another form of an embodiment, a computer program product that includes instructions is provided. When the instructions are executed, the methods on the network device side in the foregoing method embodiments may be performed.

In another form of an embodiment, a chip is provided. When the chip runs, the method for configuring a network parameter in the foregoing method embodiment may be performed.

In an embodiments of the application, the processor may be a general-purpose processor, a digital signal processor, an application-specific integrated circuit, a field programmable gate array or another programmable logic device, a discrete gate or transistor logic device, or a discrete hardware component, and may implement or execute the methods, operations, and logical block diagrams disclosed in the embodiments of this application. The general-purpose processor may be a microprocessor or any conventional processor or the like. The operations of the method disclosed with reference to the embodiments of this application may be directly performed by a hardware processor, or may be performed by using a combination of hardware and a software module that are in the processor.

In an embodiment of the application, the memory may be a non-volatile memory, such as a hard disk drive (HDD) or a solid-state drive (SSD), or may be a volatile memory, such as a random access memory (RAM). The memory is any other medium that can carry or store expected program code in a form of an instruction structure or a data structure and that can be accessed by a computer, but is not limited thereto. The memory in the embodiments of this application may alternatively be a circuit or any other apparatus that can implement a storage function, and is configured to store program instructions and/or data.

All or some of the methods provided in the embodiments of this application may be implemented by software, hardware, firmware, or any combination thereof. When software is used to implement the embodiments, all or some of the foregoing embodiments may be implemented in a form of a computer program product. The computer program product includes one or more computer instructions. When the computer program instructions are loaded and executed on a computer, the procedure or functions according to the embodiments of the present application are all or partially generated. The computer may be a general-purpose computer, a dedicated computer, a computer network, a network device, a terminal device, or another programmable apparatus. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (DSL)) or wireless (for example, infrared, radio, or microwave) manner. The computer-readable storage medium may be any usable medium that can be accessed by a computer, or a data storage device, such as a server or a data center, integrating one or more usable media. The usable medium may be a magnetic medium (for example, a floppy disk, a hard disk, or a magnetic tape), an optical medium (for example, a digital video disc (DVD)), a semiconductor medium, or the like.

In the embodiments of this application, on a premise that there is no logical contradiction, the embodiments may be mutually referenced. For example, methods and/or terms in the method embodiments may be mutually referenced, functions and/or terms in the apparatus embodiments may be mutually referenced, and functions and/or terms in the apparatus embodiments and the method embodiments may be mutually referenced.

It is clear that one of ordinary skilled in the art can make various modifications and variations to this application without departing from the scope of this application. This application is intended to cover these modifications and variations of this application provided that they fall within the scope of the following claims of this application and their equivalent technologies.

What is claimed is:

1. A method for configuring a network parameter, comprising:
obtaining network statistical data corresponding to a first period, wherein the network statistical data comprises a network transmission characteristic of a network device in the first period and a first value corresponding to a specified network parameter;
determining, based on the network statistical data, a second value corresponding to the specified network parameter; and
configuring the specified network parameter of the network device in a second period to the second value, wherein the second period is after the first period,
wherein before the obtaining network statistical data corresponding to the first period, the method further comprises:
determining that a plurality of consecutive calculated throughput differences are less than a throughput fluctuation threshold.

2. The method according to claim 1, wherein the network transmission characteristic of the network device in the first period comprises a throughput of the network device in the first period, and when the throughput of the network device in the first period increases relative to that in an initial period before the first period, and the determining the second value corresponding to the specified network parameter comprises:
modifying the first value based on a first adjustment direction and a first step length to obtain the second value.

3. The method according to claim 2, the method further comprising:
when a throughput of the network device in the second period increases relative to that in the first period, adjusting the first step length based on a first step length increment; and
when the throughput of the network device in the second period does not increase relative to that in the first period, adjusting the first step length based on a first step length decrement.

4. The method according to claim 1, wherein the network transmission characteristic of the network device in the first period comprises a throughput of the network device in the first period, and when the throughput of the network device in the first period does not increase relative to that in an initial period before the first period, and the determining the second value corresponding to the specified network parameter comprises:
determining an initial value corresponding to the specified network parameter in the initial period; and modifying the initial value based on a second adjustment direction and a second step length to obtain the second value; or
modifying the first value based on a first adjustment direction and a first step length to obtain the second value.

5. The method according to claim 4, the method further comprising:
when a throughput of the network device in the second period does not increase relative to that in the first period, or a data buffer delay does not decrease and a quantity of data throughput channels does not increase, configuring the specified network parameter of the network device in a third period to the first value, wherein the third period is after the second period.

6. The method according to claim 5, the method further comprising:
when the throughput of the network device in the second period does not decrease relative to that in the first period, and the data buffer delay decreases or the quantity of data throughput channels increases, adjusting the second step length based on a second step length increment; and
when the throughput of the network device in the second period decreases relative to that in the first period, or the data buffer delay does not decrease and the quantity of data throughput channels does not increase, adjusting the second step length based on a second step length decrement.

7. The method according to claim 5, the method further comprising:
when the throughput of the network device in the second period does not decrease relative to that in the first period, and the data buffer delay decreases or the quantity of data throughput channels increases, adjusting the second step length based on a second step length increment; and
when the throughput of the network device in the second period decreases relative to that in the first period, or the data buffer delay does not decrease and the quantity of data throughput channels does not increase, adjusting the second step length based on a second step length decrement.

8. The method according to claim 1, wherein the specified network parameter comprises at least one of: an explicit congestion notification (ECN) high threshold, an ECN low threshold or an ECN mark probability.

9. A communications apparatus, comprising:
a processor;
a communications interface configured to receive and send data; and
a memory coupled to the processor to store instructions, which when executed by the processor, cause the apparatus to perform operations, the operations comprising:
obtaining, by using the communications interface, network statistical data corresponding to a first period, wherein the network statistical data comprises a network transmission characteristic of a network device in the first period and a first value corresponding to a specified network parameter;
determining, based on the network statistical data, a second value corresponding to the specified network parameter; and
configuring the specified network parameter of the network device in a second period to the second value, wherein the second period is after the first period,
wherein before the obtaining network statistical data corresponding to the first period, the operations further comprise:
determining, by using the communications interface, that a plurality of consecutive calculated throughput differences are less than a throughput fluctuation threshold.

10. The communications apparatus according to claim 9, wherein the network transmission characteristic of the network device in the first period comprises a throughput of the network device in the first period, and when the throughput of the network device in the first period increases relative to that in an initial period before the first period, and the determining the second value corresponding to the specified network parameter comprises:
modifying the first value based on a first adjustment direction and a first step length to obtain the second value.

11. The communications apparatus according to claim 10, wherein the operations further comprise:
when a throughput of the network device in the second period increases relative to that in the first period, adjusting the first step length based on a first step length increment; and
when the throughput of the network device in the second period does not increase relative to that in the first period, adjusting the first step length based on a first step length decrement.

12. The communications apparatus according to claim 9, wherein the network transmission characteristic of the network device in the first period comprises a throughput of the network device in the first period, and when the throughput of the network device in the first period does not increase relative to that in an initial period before the first period, and the determining the second value corresponding to the specified network parameter comprises:
determining an initial value corresponding to the specified network parameter in the initial period; and modifying the initial value based on a second adjustment direction and a second step length to obtain the second value; or
modifying the first value based on a first adjustment direction and a first step length to obtain the second value.

13. The communications apparatus according to claim 12, wherein the operations further comprise:
when a throughput of the network device in the second period does not increase relative to that in the first period, or a data buffer delay does not decrease and a quantity of data throughput channels does not increase, configuring the specified network parameter of the network device in a third period to the first value, wherein the third period is after the second period.

14. The communications apparatus according to claim 13, wherein the operations further comprise:
when the throughput of the network device in the second period does not decrease relative to that in the first period, and the data buffer delay decreases or the quantity of data throughput channels increases, adjusting the second step length based on a second step length increment; and
when the throughput of the network device in the second period decreases relative to that in the first period, or the data buffer delay does not decrease and the quantity of data throughput channels does not increase, adjusting the second step length based on a second step length decrement.

15. The communications apparatus according to claim 13, wherein the operations further comprise:
when the throughput of the network device in the second period does not decrease relative to that in the first period, and the data buffer delay decreases or the quantity of data throughput channels increases, adjusting the second step length based on a second step length increment; and
when the throughput of the network device in the second period decreases relative to that in the first period, or the data buffer delay does not decrease and the quantity of data throughput channels does not increase, adjusting the second step length based on a second step length decrement.

16. The communications apparatus according to claim 9, wherein the specified network parameter comprises at least one of: an explicit congestion notification (ECN) high threshold, an ECN low threshold or an ECN mark probability.

17. A communications apparatus, comprising:
a chip, wherein when the chip runs, a method for configuring a network parameter is performed, the method comprises:
obtaining, by using the communications interface, network statistical data corresponding to a first period, wherein the network statistical data comprises a network transmission characteristic of a network device in the first period and a first value corresponding to a specified network parameter;
determining, based on the network statistical data, a second value corresponding to the specified network parameter; and
configuring the specified network parameter of the network device in a second period to the second value, wherein the second period is after the first period,
wherein before the obtaining network statistical data corresponding to the first period, the method further comprises:
determining that a plurality of consecutive calculated throughput differences are less than a throughput fluctuation threshold.

18. The communications apparatus according to claim 17, wherein the network transmission characteristic of the network device in the first period comprises a throughput of the network device in the first period, and when the throughput of the network device in the first period increases relative to that in an initial period before the first period, and the determining the second value corresponding to the specified network parameter comprises:
modifying the first value based on a first adjustment direction and a first step length to obtain the second value.

* * * * *